US010572440B2

(12) United States Patent
Kumar et al.

(10) Patent No.: US 10,572,440 B2
(45) Date of Patent: Feb. 25, 2020

(54) HIGH OPERATION FREQUENCY, AREA EFFICIENT AND COST EFFECTIVE CONTENT ADDRESSABLE MEMORY ARCHITECTURE

(71) Applicant: STMICROELECTRONICS INTERNATIONAL N.V., Schiphol (NL)

(72) Inventors: Tejinder Kumar, Moga (IN); Rathod Ronak Kishorbhai, Vadodara (IN); Apurva Sen, Ghaziabad (IN); Rakesh Malik, Noida (IN)

(73) Assignee: STMICROELECTRONICS INTERNATIONAL N.V., Schiphol (NL)

( * ) Notice: Subject to any disclaimer, the term of this patent is extended or adjusted under 35 U.S.C. 154(b) by 99 days.

(21) Appl. No.: 15/850,535

(22) Filed: Dec. 21, 2017

(65) Prior Publication Data
US 2019/0197014 A1 Jun. 27, 2019

(51) Int. Cl.
*G06F 16/90* (2019.01)
*G06F 15/78* (2006.01)
*G06F 16/903* (2019.01)

(52) U.S. Cl.
CPC .... *G06F 15/7807* (2013.01); *G06F 16/90339* (2019.01); *G06F 2212/1016* (2013.01); *G06F 2212/1041* (2013.01)

(58) Field of Classification Search
CPC ......... G11C 15/04; G11C 15/00; G06F 11/07; G06F 12/00; G06F 12/16; G06F 13/00; G06F 13/28; G06F 16/90339; G06F 16/90335; G06F 17/30; G06F 12/06; G06F 12/14; G06F 15/7807; G06F 2212/1016; G06F 2212/1041
USPC ....................................................... 711/108
See application file for complete search history.

(56) References Cited

U.S. PATENT DOCUMENTS

| 4,755,974 A * | 7/1988 | Yamada ................. G11C 15/04 365/49.1 |
| 5,440,709 A * | 8/1995 | Edgar ............... G06F 16/90339 711/1 |
| 5,893,931 A * | 4/1999 | Peng ................... G06F 12/1027 711/206 |

(Continued)

OTHER PUBLICATIONS

Locke, "Parameterizable Content-Addressable Memory," *Xilinx*, pp. 1-31, 2011.

*Primary Examiner* — Mano Padmanabhan
*Assistant Examiner* — Jean C Edouard
(74) *Attorney, Agent, or Firm* — Seed IP Law Group LLP (57) ABSTRACT

Various embodiments provide a content addressable memory (CAM) architecture that utilizes non-bit addressable memory, such as a single or dual port random access memory. The CAM includes a first non-bit addressable memory, a second non-bit addressable memory, a multiplexer, a write operation encoder, a read operation encoder, and a match signal generator. In contrast to bit addressable memories, non-bit addressable memories are widely available, have high performance frequency, and are area efficient as compared to bit addressable memories. Accordingly, the CAM architecture described herein has low costs and time to market, increased processing time, and improved area efficiency.

20 Claims, 8 Drawing Sheets

(56) References Cited

U.S. PATENT DOCUMENTS

| | | | | |
|---|---|---|---|---|
| 5,926,620 A | * | 7/1999 | Klein | G11C 29/76 |
| | | | | 711/108 |
| 6,353,332 B1 | * | 3/2002 | Brelet | G11C 15/04 |
| | | | | 326/40 |
| 6,389,507 B1 | * | 5/2002 | Sherman | H04L 45/7453 |
| | | | | 707/999.006 |
| 6,477,615 B1 | * | 11/2002 | Tanaka | G11C 15/00 |
| | | | | 365/49.17 |
| 2003/0108043 A1 | * | 6/2003 | Liao | H04L 45/00 |
| | | | | 370/392 |
| 2004/0205292 A1 | * | 10/2004 | Lu | G11C 15/00 |
| | | | | 711/108 |
| 2005/0005082 A1 | * | 1/2005 | Au | G06F 12/0893 |
| | | | | 711/170 |
| 2005/0041450 A1 | * | 2/2005 | Duh | G06F 5/06 |
| | | | | 365/1 |
| 2008/0244169 A1 | * | 10/2008 | Dawson | G06F 12/0207 |
| | | | | 711/108 |
| 2011/0307447 A1 | * | 12/2011 | Sabaa | H04L 67/2842 |
| | | | | 707/637 |

* cited by examiner

FIG.1

CAM Address Values

|   | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 0 | | | | | | | | | | 0 | 0 | 0 | 0 | 0 |
| 2 | 0 | 0 | | | | | | | | | | 0 | 0 | 0 | 0 | 0 |
| 3 | 0 | 0 | | | | | | | | | | 0 | 0 | 0 | 0 | 0 |
| 4 | 0 | 0 | | | | | | | | | | 0 | 0 | 0 | 0 | 0 |
| 5 | 0 | 0 | | | | | | | | | | 0 | 0 | 0 | 0 | 0 |
| 6 | 0 | 0 | | | | | | | | | | 0 | 0 | 0 | 0 | 0 |
| 7 | 0 | 0 | | | | | | | | | | 0 | 0 | 1 | 0 | 0 |
| ... | | | | | | | | | | | | | | | | |
| 254 | | | | | | | | | | | | | | | | |
| 256 | 0 | 0 | | | | ... | | | | | | 0 | 0 | 0 | 0 | 0 |

Data Values (row labels)

*FIG.2*

Data Bit Value

| | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 0 | 0 | 0 | 0 | 0 | 1 | 1 | 1 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |
| 10 | 0 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 0 |
| 13 | 0 | 0 | 0 | 0 | 0 | 0 | 0 | 0 |
| 14 | 0 | 0 | 0 | 0 | 0 | 0 | 0 | 0 |
| 15 | 0 | 0 | 0 | 0 | 0 | 0 | 0 | 0 |

CAM Address Values

HIGH OPERATION FREQUENCY, AREA EFFICIENT AND COST EFFECTIVE CONTENT ADDRESSABLE MEMORY ARCHITECTURE

BACKGROUND

Technical Field

The present disclosure is directed to a content addressable memory (CAM) architecture that utilizes non-bit addressable memory, such as random access memory (RAM).

Description of the Related Art

In general, standard memory, such as random access memory (RAM), receives an address as an input and returns data corresponding to the address. In contrast, content addressable memory (CAM), as the name indicates, is a memory that is content addressable. That is, a CAM receives content or data as an input and returns the address of data stored in the CAM that matches the received data.

Current CAM architectures have many drawbacks. For example, current CAM architectures are often implemented using bit addressable memory. Using bit addressable memory for a CAM is undesirable as bit addressable memory is not widely available. Consequently, manufacturers of CAMs are often unable to purchase bit addressable memories from third parties, and are forced to design bit addressable memories themselves. This increases both cost and time to market. Further, bit addressable memories become very slow as memory size increases because of the bit addressability. As such, bit addressable memories are not well suited for applications that utilize large amounts of memory. Such architectures also becomes very area inefficient, if nibble, byte and word based memories are utilized for them and, thus, are unsuitable for applications that have area constraints, such as system-on-chip (SOC) environments.

BRIEF SUMMARY

The present disclosure is directed to a content addressable memory (CAM) architecture that utilizes non-bit addressable memory, such as a single or dual port random access memory (RAM). In contrast to bit addressable memories, non-bit addressable memories are widely available and, thus, manufacturers of CAMs do not need to design and fabricate the memories themselves. Further, as non-bit addressable memories do not need to be addressed bit by bit, the sizes of the non-bit addressable memories may be large without a loss in performance for the CAM. In addition, non-bit addressable memories are area efficient as compared to bit addressable memories. That is, non-bit addressable memories do not consume large amounts of area on a chip and, thus, are ideal for applications with area constraints, such system-on-chip (SOC) environments. Accordingly, the CAM architecture described herein provides reduced costs and time to market, increased processing time, and improved area efficiency.

According to one embodiment, the CAM architecture includes a first memory; a second memory; a multiplexer, a write operation encoder, a read operation encoder, and a match signal generator. The first and second memories are non-bit addressable memories. In one embodiment, the second memory is a dual port memory. In another embodiment, the second memory is a single port memory. The second memory includes information of the data values and corresponding CAM addresses of the data values that is stored in the CAM. The first memory mirrors the information currently stored in the second memory. The multiplexer receives write data from the data input of the CAM and current data from the first memory. The multiplexer will forward either the write data from the input of the CAM or current data from the memory to the second memory based on a write/erase signal. The write operation encoder receives data from the second memory, encodes or modifies the data, and provides the modified data to the second memory. The read operation encoder receives read data from the second memory, and encodes or translates the read data to a matching CAM address. The matching CAM address is the address of the content or data stored in the CAM that matches the data at the input of the CAM. The match signal generator receives read data from the second memory, and generates a match signal based on the read data. A match signal indicates that the CAM includes content or data that matches the data at the input of the CAM.

According to one embodiment, the CAM performs a write operation to write new data into a particular CAM address. In a first step, the CAM receives write data and a write address at its data input and address input, respectively. The first memory receives the write address and provides current data to the multiplexer. The multiplexer receives the write data at the data input of the CAM and the current data from the first memory. The multiplexer and the write operation encoder then receive an erase signal. In response to receiving the erase signal, the multiplexer provides the current data to the address input of the second memory. The second memory receives a read signal and the current data at its address input from the multiplexer, and then provides read data to the write operation encoder. The write operation encoder receives the write address from the address input of the CAM and the read data from the second memory, and erases the bit of the read data that corresponds to the write address. Subsequently, the write operation encoder provides the modified read data to the data input of the second memory. The second memory receives a write signal and the modified read data at its data input, and writes the modified read data into the second memory. Next, the multiplexer and the write operation encoder receive a write signal. In response to receiving the write signal, the multiplexer provides the write data to the address input of the second memory. The second memory receives a read signal and the write data at its address input from the multiplexer, and provides read data to the write operation encoder. The write operation encoder receives the read data from the second memory, and asserts the bit of the read data that corresponds to the write address. The write operation encoder then provides the modified read data to the data input of the second memory. The second memory receives a write signal and the modified read data at its data input, and writes the modified read data into the second memory.

According to one embodiment, the CAM receives content or data and performs a read operation to search for a match of the received data and return a corresponding CAM address when there is a match. In a first step, the CAM receives match data at its data input. The match data is content or data that the CAM will search its contents for and, if there is data in the CAM that matches the match data, return the address of the data in the CAM that matches the match data. The second memory receives the match data at its address input, and provides read data to the read operation encoder and to the match signal generator. The read operation encoder translates the read data to a matching CAM address. The match signal generator generates a match signal based on the read data. The match signal indicates that the CAM includes content or data that matches the match data.

According to one embodiment, the second memory includes multiple memory modules. The multiple memory modules are arranged in parallel and assigned a certain number of the total number of bits of the second memory. By using multiple smaller memory modules instead of a single memory module, the second memory can execute at a high operation frequency as the smaller memory modules execute in parallel.

DETAILED DESCRIPTION

In the following description, certain specific details are set forth in order to provide a thorough understanding of various embodiments of the disclosure. However, one skilled in the art will understand that the disclosure may be practiced without these specific details. In some instances, well-known details associated with memory and various electronic components, such as multiplexers, logic gates, and flip flops, have not been described, to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Figure 1:
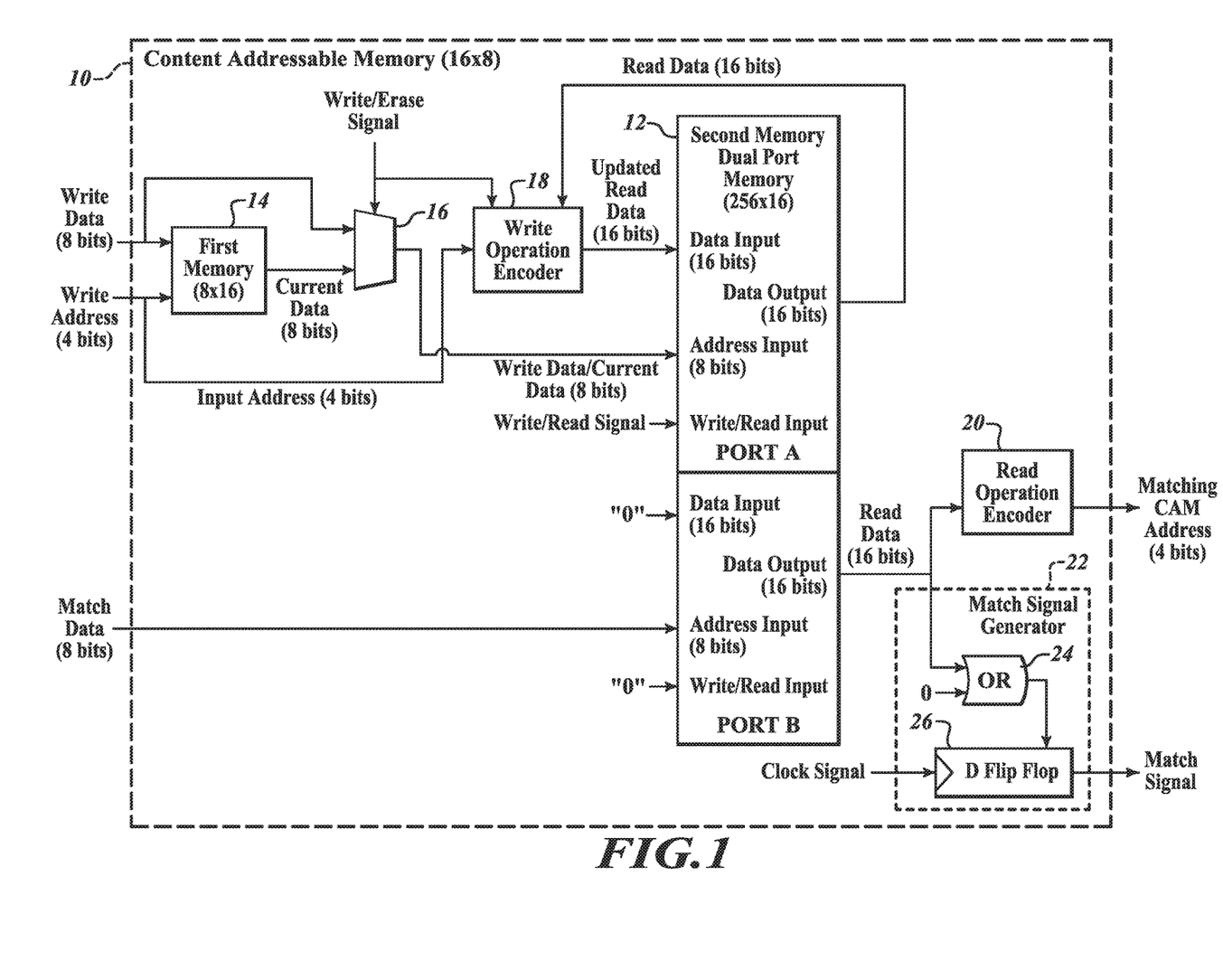
FIG. 1 shows a block diagram of a content addressable memory (CAM) including a dual port memory, according to one embodiment disclosed herein.

FIG. 1 shows a block diagram of a content addressable memory (CAM) 10 including a dual port memory 12, according to one embodiment disclosed herein. In contrast to a traditional memory that receives an address as an input and returns data at the address, the CAM 10 performs content matching. Namely, the CAM 10 receives content or data as an input and returns the address of data that matches the received data.

In the embodiment shown in FIG. 1, the CAM 10 is a 16×8 CAM. Namely, the CAM 10 has a 4 bit address line (i.e., the CAM 10 has $2^4$=16 total possible addresses) and has 8 bit input data. It is to be understood that the CAM 10 having a size of 16×8 is used for explanatory purposes. The CAM 10 may be any size.

The CAM 10 includes a first memory 14; a second memory, the dual port memory 12; a multiplexer 16; a write operation encoder 18; a read operation encoder 20; and a match signal generator 22.

The second memory, dual port memory 12, is coupled to the multiplexer 16, the write operation encoder 18, the read operation encoder 20, and the match signal generator 22. The dual port memory 12 is a standard, non-bit addressable memory that has two ports, Port A and Port B. The dual port memory 12 receives an address as an input and returns data at the address. In one embodiment, the dual port memory 12 is a dual port random access memory (RAM). As will be discussed in further detail with respect to FIGS. 4 and 5, Port A is used for a write operation, and Port B is used for a read operation.

The dual port memory 12 includes information of data values and corresponding CAM addresses of the data values that is stored in the CAM 10. The dual port memory 12 stores the information by storing one bit for every possible data value/CAM address combination. In other words, each bit in the dual port memory 12 represents a particular mapping of a CAM address to a particular data value. A bit in the dual port memory 12 is set to 1 if a particular data value is stored at that CAM address, and a bit in the dual port memory 12 is set to zero if a particular data value is not stored at that CAM address.

Accordingly, for a CAM that has n total addresses and has m bit input data, the dual port memory 12 should be at least be n bits wide at each data location to accommodate all of the CAM addresses, and have at least $2^m$ data locations to accommodate all possible values of the m bit input data. Each of the n bits represents a unique CAM address, and each of the $2^m$ data locations represents a unique data value.

Figure 2:
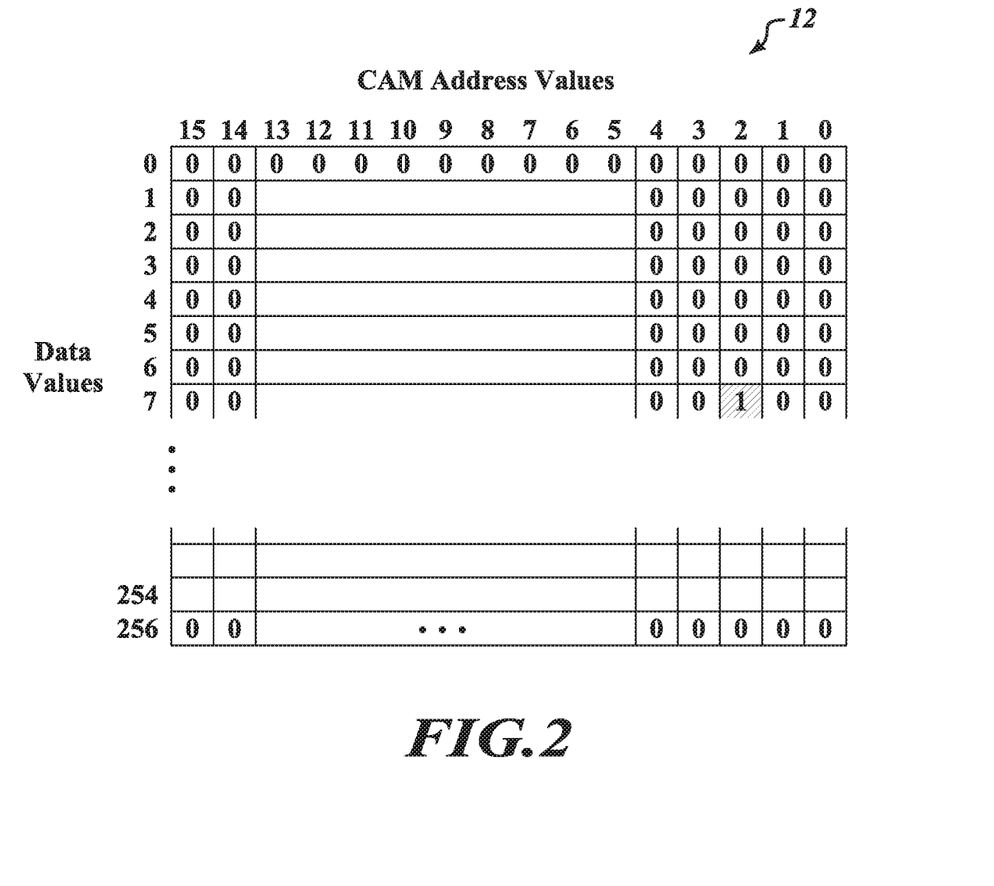
FIG. 2 shows a diagram of data stored in a dual port memory for a CAM, according to one embodiment disclosed herein.

For example, FIG. 2 shows a diagram of data stored in the dual port memory 12 for the CAM 10, according to one embodiment disclosed herein. As the CAM 10 is 16×8 (i.e., the CAM 10 has 16 total addresses and has 8 bit input data), the dual port memory 12 has a size of 256×16. That is, the dual port memory 12 has a total of 256 ($2^8$) data locations (one data location for each possible data value), and each of the 256 data locations is 16 bits wide (one bit for each possible CAM address). As shown in FIG. 2, the dual port memory 12 has a bit value of 1 at row 7 and column 2. This indicates that the CAM 10 is storing a data value of 7 at address 2.

It is important to note that, each column of the data stored in the dual port memory 12 should, at most, include a single bit equal to 1 and the remaining bits should be equal to zero. This is because each CAM address should correspond to a single data value. If a column of the dual port memory 12 contains multiple bits equal to 1, there will be ambiguity as to which data value corresponds to the CAM address. For example, referring to FIG. 2, if column 2 includes another bit value of 1 for data value (i.e., row) 6, it will be unknown as to whether data value 6 or 7 corresponds to address 2. To avoid this ambiguity, as will be discussed in further detail with respect to FIGS. 4A and 4B, a write operation includes an erase process to ensure that each CAM address corresponds to a single data value (i.e., each column includes, at most, a single bit equal to 1).

It is also important to note that, although each bit in the dual port memory 12 represents a particular mapping of a CAM address to a particular data value, the dual port memory 12 is not a bit addressable memory. Rather, as previously discussed, the dual port memory 12 is a standard, non-bit addressable memory that receives an address as an input and returns data at the address. As will be discussed in further detail with respect to FIGS. 4A and 4B, the dual port memory 12 does not need to be bit addressable by the use of the first memory 14, the multiplexer 16, and the write operation encoder 18.

The dual port memory 12 will be discussed in further detail with respect to FIGS. 4A and 4B.

The first memory 14 is coupled to the data input and the address input of the CAM 10 and the multiplexer 16. The first memory 14, similar to the dual port memory 12, is a standard, non-bit addressable memory. Namely, the first memory 14 receives an address as an input and returns data at the address. In one embodiment, the first memory 14 is RAM.

The first memory 14 mirrors the information currently stored in the dual port memory 12. That is, the first memory 14 includes information of the data values and corresponding CAM addresses of the data values that is currently stored in the CAM 10. However, in contrast to the dual port memory 12, the first memory 14 stores the data values at respective data locations, and each data location represents a respective CAM address. In other words, each data location in the first memory 14 represents a particular CAM address, and the data value at each data location in the first memory 14 is a data value of the CAM 10 stored at the particular CAM address.

Accordingly, for a CAM that has n total addresses and has m bit input data, the first memory 14 should have at least n data locations to accommodate all of the CAM addresses, and each data location should be at least m bits wide to accommodate an m bit input data.

Figure 3:
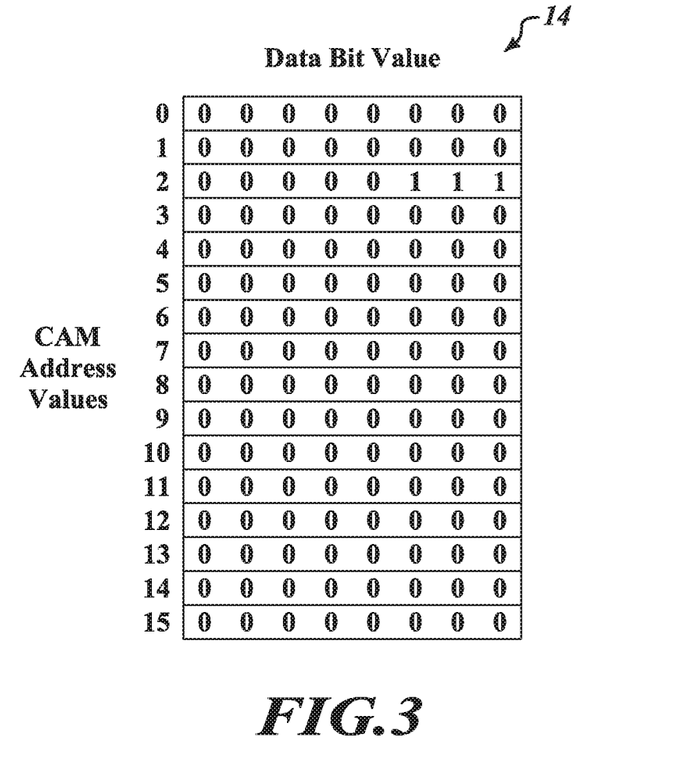
FIG. 3 shows a diagram of data stored in a first memory for a CAM, according to one embodiment disclosed herein.

For example, FIG. 3 shows a diagram of data stored in the first memory 14 for the CAM 10, according to one embodiment disclosed herein. As the CAM 10 is 16×8 (i.e., the CAM 10 has 16 total addresses and has 8 bit input data), the first memory 14 has a size of 16×8. That is, the first memory 14 has a total of 16 data locations (one data location for each possible CAM address), and each of the 16 data locations is 8 bits wide.

As previously discussed, the first memory 14 stores data values currently stored in the dual port memory 12. In the example shown in FIG. 2, the dual port memory 12 has a bit value of 1 at row 7 and column 2, which indicates that the CAM 10 has a data value 7 stored at address 2. In this example, as shown in FIG. 3, the first memory 14 will mirror or reflect the information in the dual port memory 12 and store a data bit value of 00000111 (decimal value of 7) at data location 2, which corresponds to CAM address 2.

The first memory 14 will be discussed in further detail with respect to FIGS. 4A and 4B.

The multiplexer 16 is coupled to the data input of the CAM 10, the output of the first memory 14, and the address input of Port A of the dual port memory 12. The multiplexer 16 selects between two inputs and forwards the selected input. As shown in FIG. 1, the multiplexer 16 receives write data from the data input of the CAM 10 and current data from the first memory 14. The multiplexer 16 will forward either the write data from the input of the CAM 10 or current data from the first memory 14 to the dual port memory 12 based on a write/erase signal. The multiplexer 16 will be discussed in further detail with respect to FIGS. 4A and 4B.

The write operation encoder 18 is coupled to the address input of the CAM 10 and to the data input and data output of Port A of the dual port memory 12. The write operation encoder 18 is used to perform an erase process and a write process during a write operation. The write operation encoder 18 receives data from the dual port memory 12, encodes or modifies the data to clear (i.e., set a bit to be equal to zero) or assert (i.e., set a bit to be equal to one) a bit or bits of the data, and provides the modified data to the dual port memory 12. The write operation encoder 18 will be discussed in further detail with respect to FIGS. 4A and 4B.

The read operation encoder 20 is coupled to the data output of Port B of the dual port memory 12. The read operation encoder 20 receives read data from the dual port memory 12, and encodes or translates the read data to a matching CAM address. The matching CAM address is the address of the content or data stored in the CAM 10 that matches the data at the input of the CAM 10. The read operation encoder 20 will be discussed in further detail with respect to FIG. 5.

The match signal generator 22 is coupled to the data output of Port B of the dual port memory 12. The match signal generator 22 receives read data from the dual port memory 12, and generates a match signal based on the read data. A match signal indicates that the CAM 10 includes content or data that matches the data at the input of the CAM 10. A match signal is generated if matching data is available at any CAM address.

In one embodiment, as shown in FIG. 1, the match signal generator 22 includes an OR gate 24 and a D flip flop 26. The OR gate 24 receives the read data and outputs a value of 1 as soon as the read data includes a 1. For example, using the example shown in FIG. 2, if the read data is 0000000000000100, the OR gate 24 will output a value of 1 when it receives the third bit (starting from the least significant bit). The output of the OR gate 24 is provided to the D flip flop 26. The D flip flop 26 holds the value of 1 received from the OR gate 24 until the next clock event of the clock signal. As a result, the match signal will be high when the D flip flop 26 receives a value of 1 from the OR gate 24, and will remain high even if the read data includes zeros or ones in subsequent bits.

The match signal generator 22 will be discussed in further detail with respect to FIG. 5.

Figure 4A:
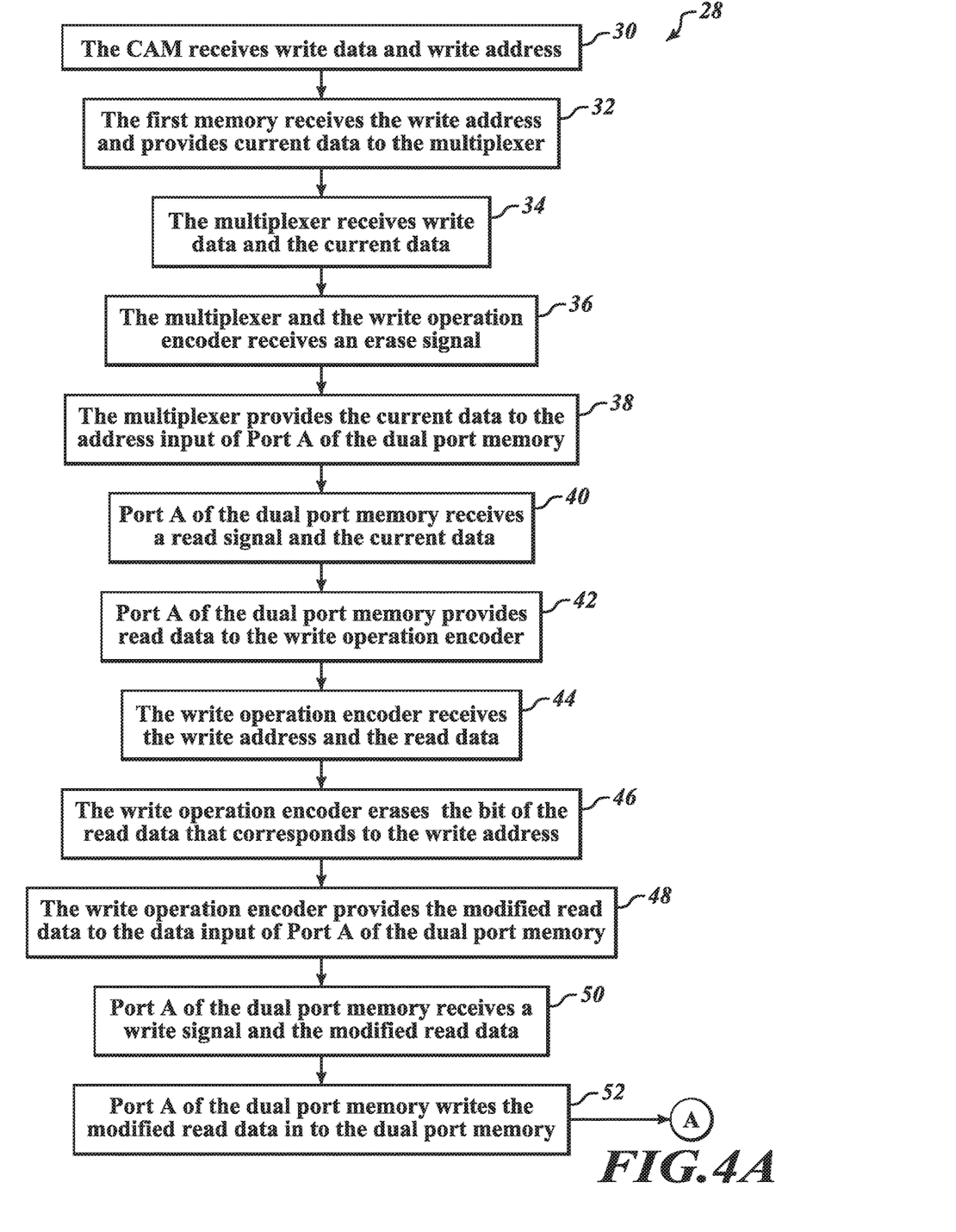
FIGS. 4A and 4B show a flow diagram of a method for performing a write operation for a CAM, according to one embodiment disclosed herein.
Figure 4B:
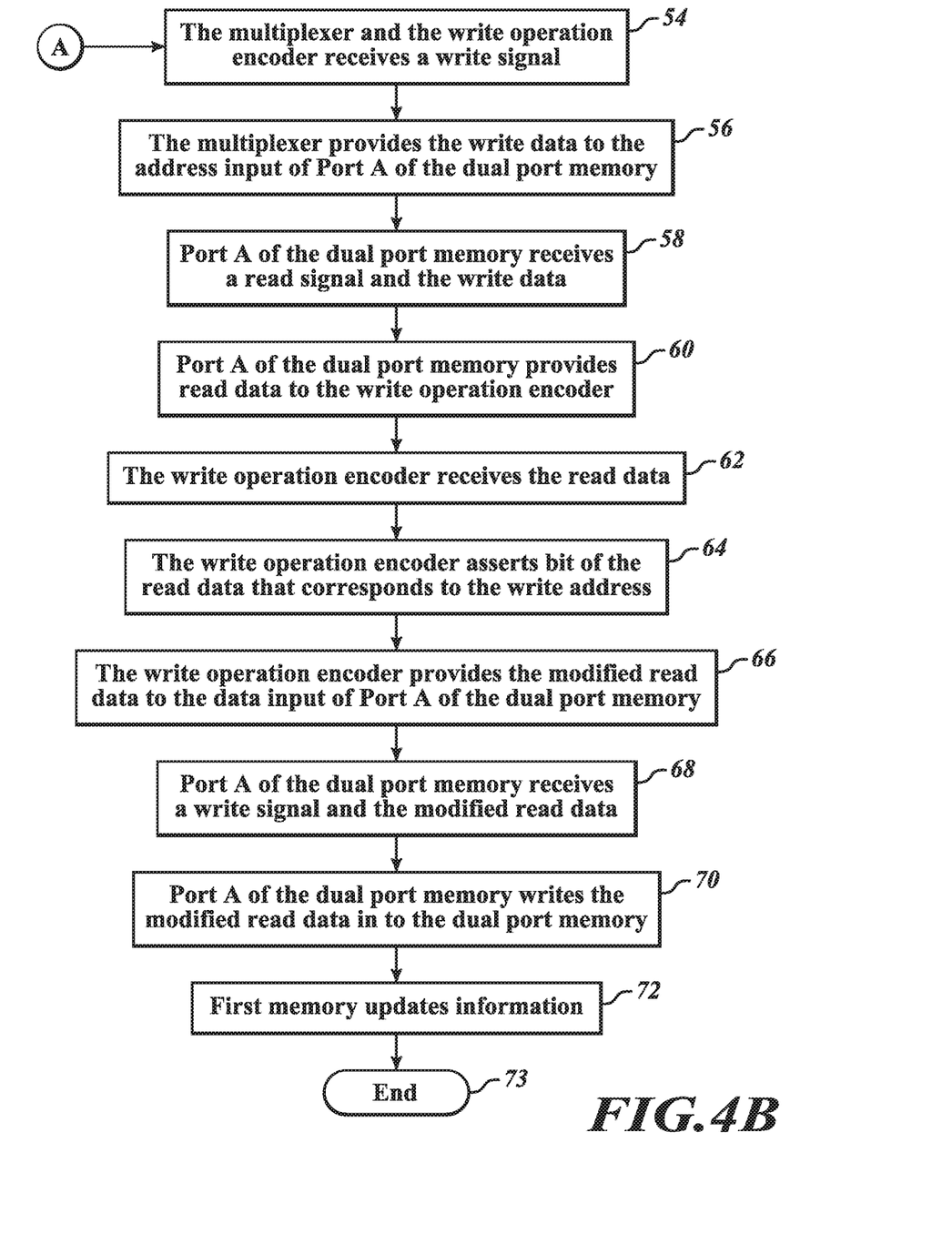

FIGS. 4A and 4B show a flow diagram of a method for performing a write operation 28 for the CAM 10, according to one embodiment disclosed herein. The write operation 28 is performed when writing new data (i.e., the write data) into a particular CAM address. The write operation includes two processes: an erase process and a subsequent write process.

The erase process clears data currently stored at a particular address before writing new data at the particular address. The erase process ensures that each CAM address corresponds to a single data value. As previously discussed, referring to the example of FIG. 2, each column of the dual port memory 12 should include a single bit equal to 1, and the remaining bits should be equal to zero. If a column of the dual port memory 12 contains multiple bits equal to 1, there will be ambiguity as to which data value corresponds to the CAM address. The erase process will be discussed with respect to steps 32 to 52.

The write process is performed subsequent to the erase process. The write process updates the information in the dual port memory 12 to denote that the new data (i.e., the write data) is at the particular CAM address. The write process will be discussed in further detail with respect to steps 54 to 70.

In step 30, the CAM 10 receives write data and a write address at its data input and address input, respectively. The write data is new content or data that is to be written into the CAM 10 at the write address.

For explanatory purposes, with respect to FIGS. 4A and 4B, it will be assumed that the write data is equal to 00000110 (decimal value of 6) and the write address is equal to 0010 (decimal value of 2). It is important to note that the write data is 8 bits wide and the write address is 4 bits wide because the CAM 10 is a 16×8 CAM (i.e., the CAM 10 has a 4 bit address line and has 8 bit input data) in this particular example.

In step 32, the first memory 14 receives the write address and provides current data to the multiplexer 16. More specifically, the first memory 14 receives the write address from the address input of the CAM 10, retrieves the current data corresponding to the write address, and transmits the current data to the multiplexer 16. For example, the first memory 14 receives the write address 0010 (decimal value of 2); retrieves the current data corresponding to address 0010, which as shown in FIG. 3 is 00000111 (decimal value of 7); and transmits the current data 00000111 to the multiplexer 16.

As previously discussed, the first memory 14 includes information of the data values and corresponding CAM addresses of the data values that is currently stored in the CAM 10. The first memory 14 stores the data values at respective data locations, and each data location represents a respective CAM address. Thus, the current data 00000111, which is transmitted to the multiplexer 16, indicates that data 00000111 is currently stored in the CAM 10 at address 0010.

In step 34, the multiplexer 16 receives the write data from the data input of the CAM 10 and the current data from the first memory 14. For example, the multiplexer 16 receives the write data 00000110 and the current data 00000111. As previously discussed, the multiplexer 16 will forward either the write data or current data to the dual port memory 12 based on a write/erase signal.

In step 36, the multiplexer 16 and the write operation encoder 18 receives an erase signal. The erase signal indicates to the multiplexer 16 and the write operation encoder 18 that an erase process is being performed. As will be discussed in further detail in subsequent steps, the multiplexer 16 and the write operation encoder 18 perform different operations depending on whether an erase process or a write process is being performed.

In step 38, in response to receiving the erase signal, the multiplexer 16 provides the current data, which was received from the first memory 14, to the address input of Port A of the dual port memory 12. For example, the multiplexer 16 provides the current data 00000111 to the address input of Port A of the dual port memory 12. The multiplexer 16 does not forward the write data at this time.

In step 40, Port A of the dual port memory 12 receives a read signal, and receives the current data at its address input from the multiplexer 16. For example, the dual port memory 12 receives the current data 00000111 from the multiplexer 16. The read signal switches Port A of the dual port memory 12 into a read mode. When in the read mode, Port A of the dual port memory 12 receives an address as an input and returns data at the address.

In step 42, Port A of the dual port memory 12 provides read data to the write operation encoder 18. The dual port memory 12 obtains the read data by retrieving data stored at the location indicated by the current data. For example, the dual port memory 12 receives the current data 00000111 (decimal value of 7) at its address input; retrieves the read data corresponding to the current data 00000111, which as shown in FIG. 2 is 0000000000000100 (row 7); and transmits the read data 0000000000000100 to the write operation encoder 18.

In step 44, the write operation encoder 18 receives the write address from the address input of the CAM 10, and the read data from Port A of the dual port memory 12. For example, the write operation encoder 18 receives the write address 0010 (decimal value of 2) and the read data 0000000000000100.

Although step 44 includes the write operation encoder 18 receiving the write address, the write operation encoder 18 may have received the write address at any time. For example, the write operation encoder 18 may have received the write address prior to receiving the read data.

In step 46, the write operation encoder 18 erases the bit of the read data that corresponds to the write address. For example, the write operation encoder 18 erases the bit of the read data 0000000000000100 that corresponds to the write address 0010 (decimal value of 2). The write operation encoder 18 erases a bit by setting the bit to be equal to zero. As shown in FIG. 2, the write address 0010 corresponds to the third bit (starting from the least significant bit). Thus, in this example, the third bit is set to be equal to zero, and the modified read data is 0000000000000000.

In step 48, the write operation encoder 18 provides the modified read data to the data input of Port A of the dual port memory 12. For example, the write operation encoder 18 provides modified read data 0000000000000000 to the data input of Port A of the dual port memory 12.

In step 50, Port A of the dual port memory 12 receives a write signal at its write/read input, and receives the modified read data at its data input. For example, the dual port memory 12 receives the modified read data 0000000000000000 from the write operation encoder 18. The write signal switches Port A of the dual port memory 12 from the read mode to a write mode. When in the write mode, Port A of the dual port memory 12 writes data at the data input of Port A at the address at the address input of Port A.

In step 52, Port A of the dual port memory 12 writes the modified read data into the dual port memory 12 at the data location corresponding to the current data. For example, as Port A of the dual port memory 12 received the current data 00000111 (decimal value 7) in step 40 at its address input, the dual port memory 12 writes the modified read data 0000000000000000 at the data location corresponding to the current data 00000111. Specifically, as shown in FIG. 2, row 7 corresponds to the current data 00000111, and is updated to be 0000000000000000.

Upon completion of step 52, old data stored in the dual port memory 12 is erased and the erase process is complete. The write process may now begin to write new data in to the dual port memory 12.

In step 54, the multiplexer 16 and the write operation encoder 18 receives a write signal. The write signal indicates to the multiplexer 16 and the write operation encoder 18 that a write process is being performed. As will be discussed in further detail in subsequent steps, the multiplexer 16 and the write operation encoder 18 perform different operations when performing a write process.

In step 56, in response to receiving the write signal, the multiplexer 16 provides the write data, which was received in step 34, to the address input of Port A of the dual port memory 12. For example, the multiplexer 16 provides the write data 00000110 to the address input of Port A of the dual port memory 12. The multiplexer 16 does not forward the current data.

In step 58, Port A of the dual port memory 12 receives a read signal, and receives the write data at its address input from the multiplexer 16. For example, the dual port memory 12 receives the write data 00000110 from the multiplexer 16. As previously discussed, the read signal switches Port A of the dual port memory 12 in to a read mode. When in the read mode, Port A of the dual port memory 12 receives an address as an input and returns data at the address.

In step 60, Port A of the dual port memory 12 provides read data to the write operation encoder 18. As previously discussed, the dual port memory 12 obtains the read data by retrieving data stored at the location indicated by the write data. For example, the dual port memory 12 receives the write data 00000110 (decimal value of 6) at its address input; retrieves the read data corresponding to the current write data 00000110, which as shown in FIG. 2 is 0000000000000000 (row 6); and transmits the read data 0000000000000000 to the write operation encoder 18.

In step 62, the write operation encoder 18 receives the read data from Port A of the dual port memory 12. For example, the write operation encoder 18 receives the read data 0000000000000000. It is noted that the write operation encoder 18 already has the write address from the address input of the CAM 10 during step 44.

In step 64, the write operation encoder 18 asserts the bit of the read data that corresponds to the write address. For example, the write operation encoder 18 asserts the bit of the read data 0000000000000000 that corresponds to the write address 0010 (decimal value of 2). The write operation encoder 18 asserts a bit by setting the bit to be equal to 1. As shown in FIG. 2, the write address 0010 corresponds to the third bit (starting from the least significant bit). Thus, in this example, the third bit is set to be equal to 1, and the modified read data is 0000000000000100 (decimal value of 2).

In step 66, the write operation encoder 18 provides the modified read data to the data input of Port A of the dual port memory 12. For example, the write operation encoder 18 provides modified read data 0000000000000100 to the data input of Port A of the dual port memory 12.

In step 68, Port A of the dual port memory 12 receives a write signal at its write/read input, and receives the modified read data at its data input. For example, the dual port memory 12 receives the modified read data 0000000000000100 from the write operation encoder 18. As previously discussed, the write signal switches Port A of the dual port memory 12 to from the read mode to a write mode. When in the write mode, Port A of the dual port memory 12 writes data at the data input of Port A at the address input of Port A.

In step 70, Port A of the dual port memory 12 writes the modified read data in to the dual port memory 12 at the data location corresponding to the write data. For example, as Port A of the dual port memory 12 received the write data 00000110 (decimal value 6) in step 58 at its address input, the dual port memory 12 writes the modified read data 0000000000000100 at the data location corresponding to the write data 00000110. That is, as shown in FIG. 2, row 6 corresponds to the current data 00000110, and is updated to be 0000000000000100 (decimal value of 2).

Upon completion of step 70, the information stored in the dual port memory 12 has been updated and the write process is complete. For example, information stored in the dual port memory 12 now indicates that the new write data 00000110 has a corresponding address 2.

In step 72, the first memory 14 updates the information stored in the first memory 14. As previously discussed, the first memory 14 mirrors the information currently stored in the dual port memory 12. Thus, after the modified read data is stored into the dual port memory 12 in step 70, the information stored in the first memory 14 is updated to reflect the changes in the dual port memory 12. For example, as the dual port memory 12 was updated to indicate that the new write data 00000110 has a corresponding address 2, the first memory is updated to store a data bit value of 00000110 at data location (row) 2, which corresponds to CAM address 2.

In step 73, the write operation 28 ends.

In one embodiment, the write operation 28 is performed in four total clock cycles, with the erase process consuming two clock cycles and the write process consuming two clock cycles. Steps 32 to 48 are performed in a first cycle, steps 50 to 52 are performed in a second cycle, steps 54 to 66 are performed in a third cycle, and steps 68 to 70 are performed in a fourth cycle.

Figure 5:
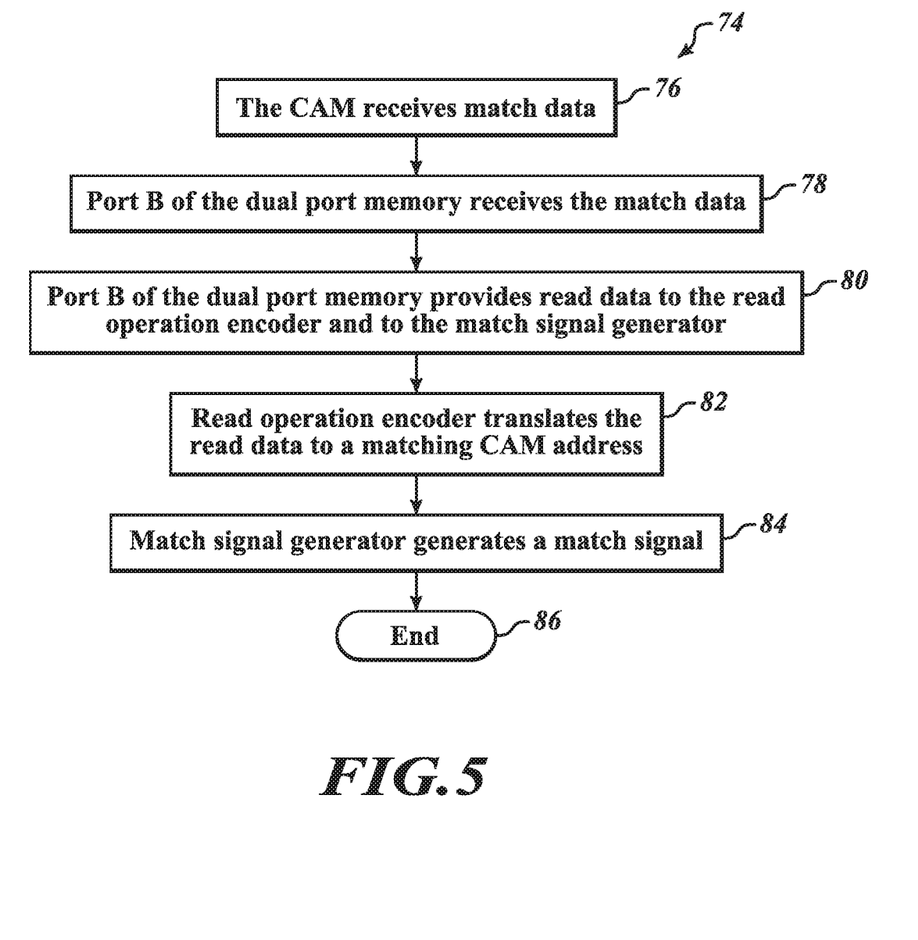
FIG. 5 shows a flow diagram of a method for performing a read operation for a CAM, according to one embodiment disclosed herein.

FIG. 5 shows a flow diagram of a method for performing a read operation 74 for the CAM 10, according to one embodiment disclosed herein. The read operation 74 is performed when the CAM 10 receives content or data as an input, and performs content matching.

In step 76, the CAM 10 receives match data at its data input. The match data is content or data that the CAM 10 will search its contents for and, if there is data in the CAM 10 that matches the match data, return the corresponding address of the data in the CAM 10 that matches the match data.

For explanatory purposes, with respect to FIG. 5, it will be assumed that the match data is equal to 00000111 (decimal value of 7). As previously discussed, the match data is 8 bits wide because the CAM 10 is a 16×8 CAM (i.e., the CAM 10 has 8 bit input data) in this particular example.

In step 78, Port B of the dual port memory receives the match data at its address input. For example, the dual port memory 12 receives the match data 00000111. In contrast to Port A, Port B is used for reading data and is not used for writing data. Thus, Port B is set into a read mode. For example, the write/read input of Port B may be grounded or configured to receive a low/zero signal. The data input of Port B does not receive any data. For example, the data input of Port B may be grounded or configured to receive a low/zero signal.

In step 80, Port B of the dual port memory provides the read data to the read operation encoder 20 and to the match signal generator 22. The dual port memory 12 obtains the read data by retrieving data stored at the location indicated by the match data. For example, the dual port memory 12 receives the match data 00000111 (decimal value of 7) at its address input; retrieves the read data corresponding to the match data 00000111, which as shown in FIG. 2 is 0000000000000100 (row 7); and transmits the read data 0000000000000100 to the read operation encoder 20 and to the match signal generator 22.

In step 82, the read operation encoder 20 translates the read data to a matching CAM address. As previously discussed, the matching CAM address is the address that corresponds to data stored in the CAM 10 that matches the data at the input of the CAM 10. For example, the read data in this case is 0000000000000100. As shown in FIG. 2, the third bit (starting from the least significant bit) corresponds to CAM address 2. Accordingly, the read operation encoder 20 translates the read data 0000000000000100 to 0010 (decimal value of 2). It is important to note that the matching CAM address is 4 bits wide because the CAM 10 is a 16×8 CAM (i.e., the CAM 10 has 4 bit addresses) in this particular example.

In step 84, the match signal generator 22 generates a match signal based on the read data. As previously discussed, a match signal indicates that the CAM 10 includes content or data that matches the match data. A match signal is generated if matching data is available at any CAM address. For example, in response to receiving the read data 0000000000000100, the match signal generator 22 will generate a match signal as the third bit (starting from the least significant bit), which has a value of 1, indicates there is a match. In contrast, if the read data is 0000000000000000, the match signal generator 22 will not generate a match signal as none of the bits indicate that there is a match (i.e., none of the bits are equal to 1).

In step 86, the read operation 74 ends.

Figure 6:
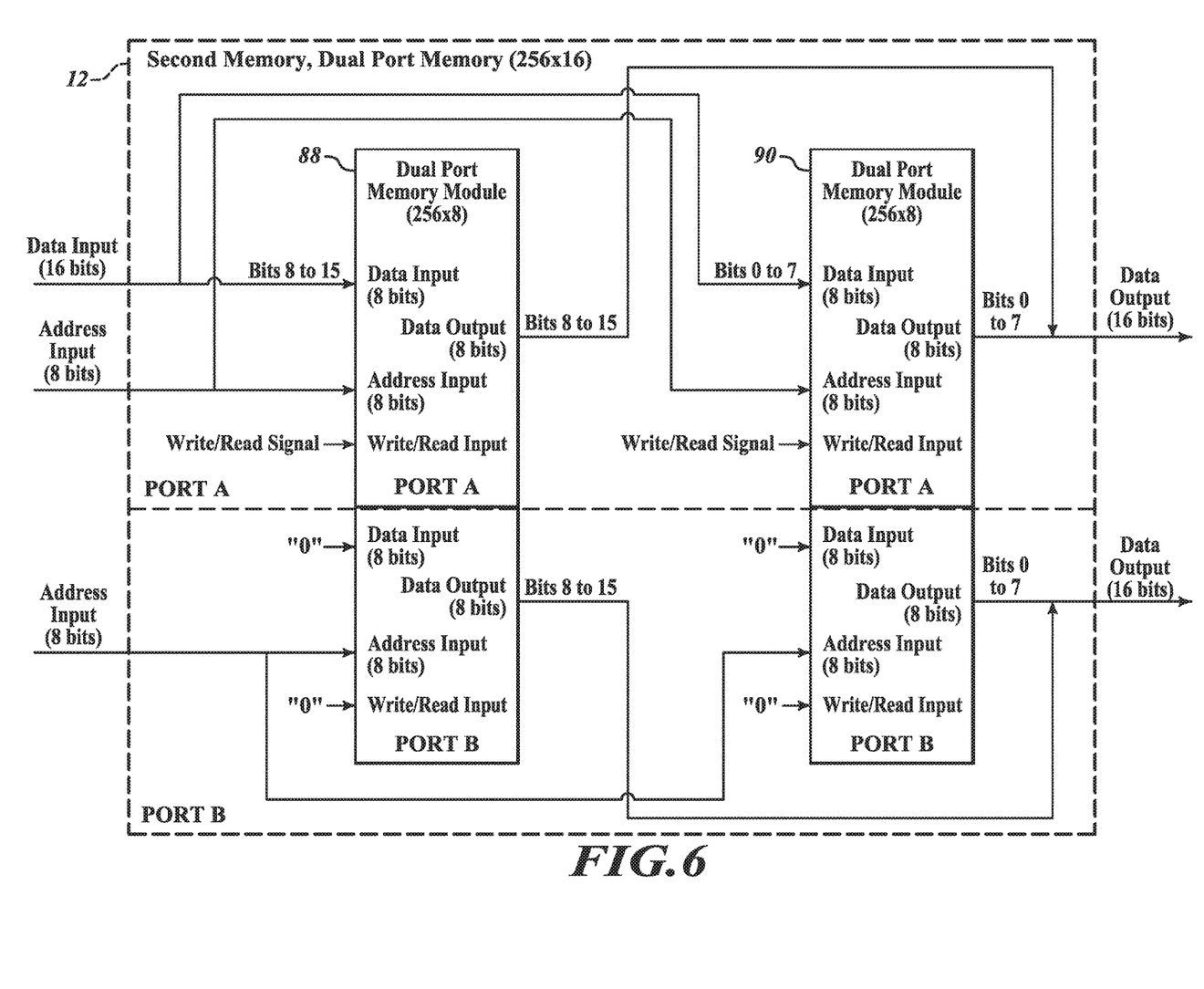
FIG. 6 shows a block diagram of a dual port memory including multiple dual port memory modules, according to one embodiment disclosed herein.

In one embodiment, the dual port memory 12 is composed of multiple smaller memories arranged in parallel. FIG. 6 shows a block diagram of the dual port memory 12 including multiple memory modules, according to one embodiment disclosed herein. As shown in FIG. 6, the dual port memory 12 includes a first dual port memory module 88 and a second dual port memory module 90. Similar to the dual port memory 12, each of the first and second dual port memory modules 88, 90 is a standard, non-bit addressable memory that has two ports, Port A and Port B. Each of the first and second dual port memory modules 88, 90 receives an address as an input and returns data at the address. In one embodiment, each of the first and second dual port memory modules 88, 90 is a dual port RAM.

The first memory module 88 and the second memory module 90 together form the dual port memory 12. Namely, the first memory module 88 and the second memory module 90 are smaller sized memory modules that create a larger sized memory, the dual port memory 12. To create a larger sized memory, the first dual port memory module 88 and the second memory module 90 are arranged in parallel and are assigned a certain number of the total number of bits of the dual port memory 12.

For example, as the dual port memory 12 of FIG. 1 has a size of 256×16 (i.e., 256 data locations with each data location being 16 bits wide), the first dual port memory module 88 is used to store bits 8 to 16 of the 16 total bits for each data location, and the second dual port memory module 90 is used to store bits 0 to 7 of the total 16 bits for each data location. Thus, the first and second dual port memory modules 88, 90 each at least have a size of 256×8 (256 data locations with each data location being 8 bits wide). The data outputs of the first and second dual port memory modules 88, 90 are then combined to create the data output of the dual port memory 12. That is, bits 8 to 16 outputted from the first dual port memory module 88 is combined with bits 0 to 7 outputted from the second dual port memory module 90 to create the total 16 bits.

Accordingly, for Port A, the data input of the dual port memory 12 is coupled to both the data input of the first dual port memory module 88 and the data input of the second dual port memory module 90. The data input of the first dual port memory module 88 receives bits 8 to 15, and the data input of the second dual port memory module 90 receives bits 0 to 7. The address input of the dual port memory 12 is coupled to both the address input of the first dual port memory module 88 and the address input of the second dual port memory module 90. The data output of the first dual port memory module 88 and the data output of the second dual port memory module 90 are coupled to the data output of the dual port memory 12.

Similarly, for Port B, the address input of the dual port memory 12 is coupled to both the address input of the first dual port memory module 88 and the address input of the second dual port memory module 90. The data output of the first dual port memory module 88 and the data output of the second dual port memory module 90 are coupled to the data output of the dual port memory 12.

It is to be understood that, although each of the first and second dual port memory modules 88, 90 is assigned 8 bits in FIG. 6, each of the first and second dual port memory modules 88, 90 may be assigned any number of bits. For example, the first dual port memory module 88 may have a size of 256×12 and be assigned bits 4 to 16, and the second dual port memory module 90 may have a size of 256×4 and be assigned bits 0 to 3. In addition, although only two dual port memory modules are shown in FIG. 6, the dual port memory 12 may include any number of smaller dual port memory modules. For example, the dual port memory 12 may include 4, 8, or 12 dual port memory modules.

By using multiple smaller memory modules instead of a single memory module, the dual port memory 12 can execute at a high operation frequency as the smaller memory modules execute in parallel. For example, the first dual port memory module 88 processes bits 8 to 15 simultaneously with the second dual port memory module 90 processing bits 0 to 7. Accordingly, the dual port memory 12 is able to achieve faster processing times.

Figure 7:
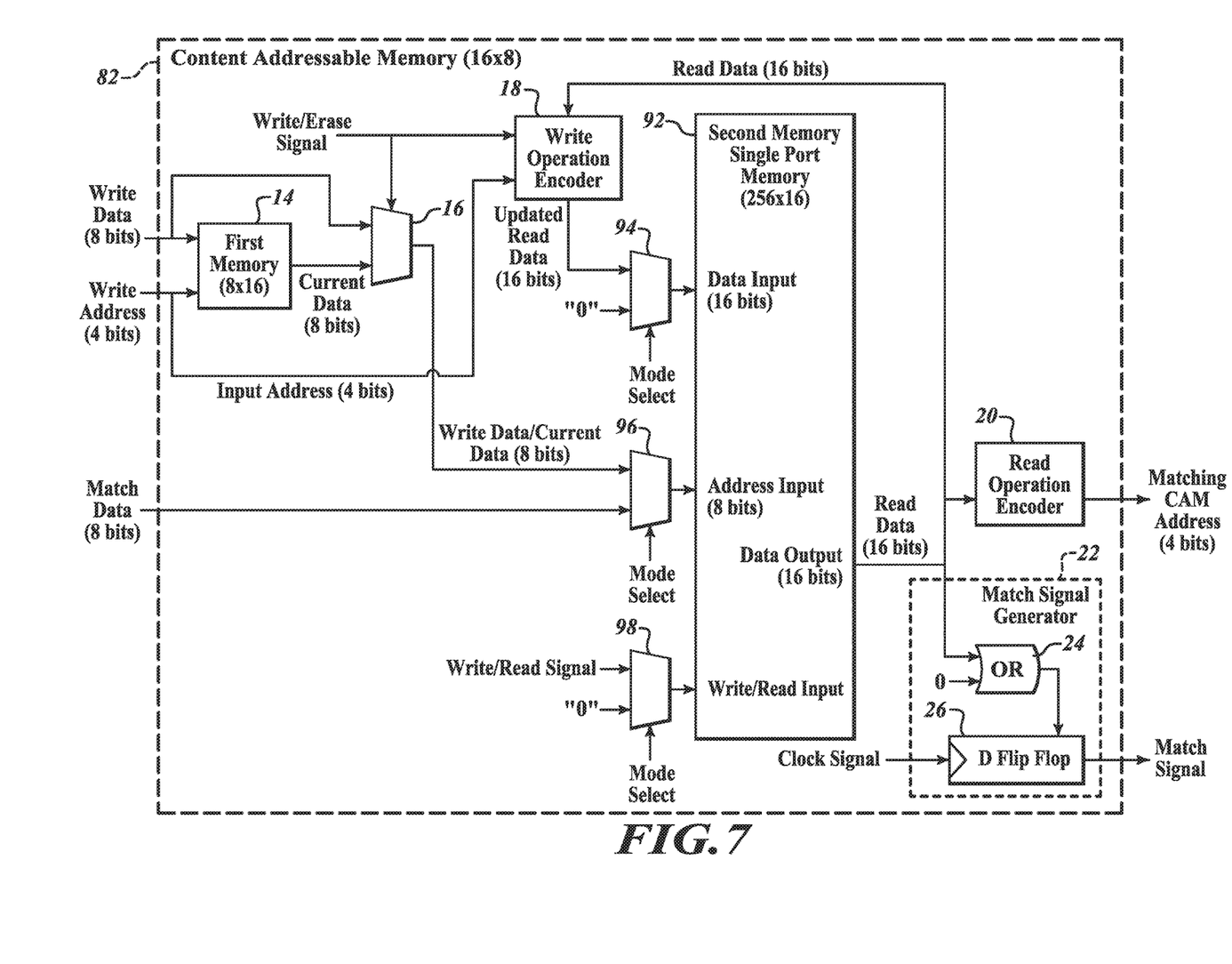
FIG. 7 shows a block diagram of a CAM including a single port memory, according to one embodiment disclosed herein.

In one embodiment, the CAM 10 includes a single port memory, instead of the dual port memory 12. FIG. 7 shows a block diagram of a CAM 82 including a single port memory 92, according to one embodiment disclosed herein.

The CAM 82 is substantially the same as the CAM 10. The CAM 82 includes the first memory 14, the multiplexer 16, the write operation encoder 18, the read operation encoder 20, and the match signal generator 22. However, the CAM 82 includes the single port memory 92 instead of the dual port memory 12, and includes additional multiplexers 94, 96, 98.

The single port memory 92 is a standard, non-bit addressable memory that has a single port. The single port memory 92 receives an address as an input and returns data at the address. In one embodiment, the single port memory 92 is a single port RAM.

The multiplexer 94 is coupled to the write operation encoder 18 and the data input of the single port memory 92. The multiplexer 96 is coupled to the multiplexer 16 and the address input of the single port memory 92. The multiplexer 98 is coupled to the single port memory 92. The additional multiplexers 94, 96, 98 switch the modes of the CAM 82 between a write operation mode and a read operation mode. In one embodiment, the multiplexers 94, 96, 98 receive a logic zero signal for the write operation mode, and receive a logic one signal for the read operation mode.

In the write operation mode, the CAM 82 is configured to perform the write operation 28 as described with respect to FIGS. 4A and 4B. In other words, the CAM 82 is configured to behave the same as Port A of the CAM 10. The multiplexer 94 receives modified read data from the write operation encoder 18 and forwards the modified read data to the data input of the single port memory 92. The multiplexer 96 receives the write data/the current data from the multiplexer 16 and forwards the write data/the current data to the address input of the single port memory 92. The multiplexer 98 receives the write/read signal and forwards the write/read signal to the signal port memory 92.

In the read operation mode, the CAM 82 is configured to perform the read operation 74 as described with respect to FIG. 5. In other words, the CAM 82 is configured to behave the same as Port B of the CAM 10. The multiplexer 94 does not receive or forward any data to the data input of the single port memory 92. The multiplexer 96 receives the match data and forwards the match data to the address input of the single port memory 92. The multiplexer 98 does not receive or forward any data to the write/read input of the single port memory 92.

In one embodiment, similar to the embodiment shown in FIG. 6, the single port memory 92 is composed of multiple smaller memories arranged in parallel. However, in contrast to the embodiment shown in FIG. 6, the single port memory 92 includes multiple single port memory modules. The single port memory modules together create a larger sized memory. The single port memory modules are arranged in parallel and assigned a certain number of the total number of bits of the single port memory 92.

As previously discussed, using bit addressable memory for a CAM is undesirable and has many drawbacks. For example, bit addressable memories increase cost and time to market due to lack of availability; bit addressable memories with large memory sizes have long processing times; and the bit addressable memories are area inefficient and unsuitable for applications with area constraints, such as system-on-chip (SOC) environments. The CAM architecture described herein avoids these issues by using non-bit addressable memory, such as a single or dual port RAM. In contrast to bit addressable memories, non-bit addressable memories are widely available and, thus, manufacturers of CAMs do not need to fabricate the memories themselves. Further, as non-bit addressable memories do not need to be addressed bit by bit, the sizes of the non-bit addressable memories may be large without a loss in performance for the CAM. As previously discussed, performance may also be further improved by using multiple smaller memory modules arranged in parallel. In addition, non-bit addressable memories are area efficient as compared to bit addressable memories. That is, non-bit addressable memories do not consume large amounts of area on a chip and, thus, are ideal for applications with area constraints, such SOC environments. Accordingly, the CAM architecture described herein provides reduced costs and time to market, increased processing time, and improved area efficiency.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving, by a content addressable memory, input data and an input address, the content addressable memory including a first memory and a second memory;
retrieving first data from the first memory based on the input address;
retrieving second data from the second memory based on the first data;
modifying the second data based on the input address;
writing the modified second data in to the second memory;
retrieving third data from the second memory based on the input data;
modifying the third data based on the input address; and
writing the modified third data in to the second memory.

2. The method of claim 1 wherein modifying the second data includes setting a bit of the second data to zero.

3. The method of claim 1 wherein modifying the third data includes setting a bit of the third data to one.

4. The method of claim 1 wherein the retrieving of the third data is performed subsequent to the writing of the modified second data.

5. The method of claim 1, further comprising:
writing fourth data to the first memory based on the modified third data.

6. The method of claim 1, further comprising:
receiving, by the content addressable memory, another input data;
searching the second memory for data that matches the another input data; and
outputting, by the content addressable memory, an address associated with the data that matches the another input data.

7. A content addressable memory, comprising:
a data input that, in operation, receives input data;
an address input that, in operation, receives an input address;
a first memory that, in operation, receives the input address and retrieves first data stored in the first memory based on the input address;
a second memory that, in operation, receives the first data and retrieves second data stored in the second memory based on the first data; and
an encoder that, in operation, receives the second data, modifies the second data based on the input address, and stores the modified second data in the second memory.

8. The content addressable memory of claim 7, further comprising:
a multiplexer that, in operation, receives the input data from the data input and the first data from the first memory.

9. The content addressable memory of claim 8 wherein the multiplexer, when in operation, provides the input data to the second memory in response to the multiplexer receiving a write signal, and provides the first data to the second memory in response to the multiplexer receiving an erase signal.

10. The content addressable memory of claim 7 wherein the second memory is a dual port random access memory.

11. The content addressable memory of claim 7 wherein the second memory is a single port random access memory.

12. The content addressable memory of claim 7 wherein the second memory includes a plurality of memory modules configured to operate in parallel.

13. The content addressable memory of claim 7 wherein the first memory has m data locations, each of the m data locations of the first memory has n bits, the second memory has $2^n$ data locations, and each of the $2^n$ data locations of the second memory has m bits.

14. The content addressable memory of claim 7 wherein the input data has n bits and the second memory has $2^n$ data locations.

15. The content addressable memory of claim 7 wherein the second memory, when in operation, receives the input data and retrieves third data stored in the second memory based on the input data, and the encoder, when in operation, receives the third data, modifies the third data based on the input address, and stores the modified third data in the second memory.

16. The content addressable memory of claim 7 wherein the second memory receives the first data at an address input of the second memory.

17. A method, comprising:

receiving, by a content addressable memory, input data and an input address, the content addressable memory including a first memory and an encoder;

selecting, by the first memory, first data from data stored in the first memory, the first data being selected based on the input data;

providing, by the first memory, the first data to the encoder;

modifying, by the encoder, the first data by changing a bit of the first data indicated by the input address; and storing the modified first data in to the first memory.

18. The method of claim 17 wherein the content addressable memory includes a second memory, the method further including:

selecting, by the second memory, second data based on the input address;

providing, by the second memory, the second data to the first memory;

selecting, by the first memory, third data based on the second data;

providing, by the first memory, the third data to the encoder;

modifying, by the encoder, the third data based on the input address; and storing the modified third data in to the first memory.

19. The method of claim 18, further comprising:

receiving, by a multiplexer, the input data and the second data;

receiving, by the multiplexer, a write signal;

providing, by the multiplexer, the input data to the first memory in response to the multiplexer receiving the write signal;

receiving, by the multiplexer, an erase signal; and providing, by the multiplexer, the second data to the first memory in response to the multiplexer receiving the erase signal.

20. The method of claim 18 wherein the encoder modifies the first data by setting a bit of the first data to one, and modifies the second data by setting a bit of the second data to zero.

* * * * *